United States Patent [19]

Chapman

[11] Patent Number: 5,674,382

[45] Date of Patent: Oct. 7, 1997

[54] WET OXIDATION APPARATUS WITH COMPRESSOR

[75] Inventor: Robert D. Chapman, Harrogate, England

[73] Assignee: The BOC Group plc, Windlesham, England

[21] Appl. No.: 584,829

[22] Filed: Jan. 11, 1996

[30] Foreign Application Priority Data

Jan. 13, 1995 [GB] United Kingdom .................. 9500663

[51] Int. Cl.$^6$ .............................. B01D 17/12; C02F 1/74
[52] U.S. Cl. ....................... 210/96.1; 137/93; 210/101; 210/143; 210/177; 210/205; 210/761; 366/152.2; 366/160.1; 422/108
[58] Field of Search ................................. 210/101, 143, 210/175, 177, 205, 206, 760, 761, 762; 422/62, 108, 110, 186.08, 186.11, 186.14; 366/131, 132, 152.1, 152.2, 160.1, 160.2, 160.3, 160.5, 162.1; 261/97; 137/9, 88

[56] References Cited

U.S. PATENT DOCUMENTS

| 4,340,471 | 7/1982 | Jordan | 210/206 |
|---|---|---|---|
| 4,350,599 | 9/1982 | Chowdhury | 210/761 |
| 4,369,115 | 1/1983 | Bauer | 210/761 |
| 4,395,339 | 7/1983 | Chowdhury et al. | 210/761 |
| 4,673,296 | 6/1987 | Sjogren | 366/160.2 |

FOREIGN PATENT DOCUMENTS

| 2034684 | 6/1980 | United Kingdom . |
|---|---|---|
| 2221981 | 2/1990 | United Kingdom . |

Primary Examiner—Joseph W. Drodge
Attorney, Agent, or Firm—R. Hain Swope; Salvatore P. Pace

[57] ABSTRACT

A wet oxidation apparatus includes a device for raising the pressure of liquid oxygen; an evaporator for evaporating the liquid oxygen; a device for supplying nitrogen including a compressor for compressing atmospheric air and for supplying the compressed air to a first mixer, a storage container for storing liquid nitrogen; a device for raising the pressure of liquid nitrogen; a second evaporator for evaporating the liquid nitrogen; the first mixer located for mixing the evaporated oxygen and nitrogen; a second mixer for mixing the resultant gas with waste water to be treated, and a reactor for receiving the mix of gas and water.

8 Claims, 3 Drawing Sheets

WET OXIDATION APPARATUS WITH COMPRESSOR

FIELD OF THE INVENTION

The present invention relates to the treatment of waste water and other liquids containing oxidizable materials and relates particularly, but not exclusively, to an apparatus for such treatment.

BACKGROUND OF THE INVENTION

Present techniques for the treatment of waste water include the separation from water of polluting substances which are then destroyed or converted to a non-polluting form or substance. Separation can be achieved by, for example, decantation, precipitation or adsorption. Destruction/conversion could be by biological oxidation with activated sludge, incineration with chemical oxidation, anaerobic digestion or other techniques known to those skilled in the art.

An alternative, commonly used process, is the wet oxidation process, in which large quantities of oxygen or oxygen containing gas are introduced into waste water before its introduction into a high temperature reactor in which oxidation takes place at elevated temperatures. Wet oxidation may be carried out at temperatures above or below the critical temperature of the fluid and are thus termed super-critical or sub-critical, respectively. Whilst there are no fixed definitions, the critical temperature and pressure of water are generally taken to be about 375° C. and 220 bar. Super critical wet oxidation typically takes place at around 600° C. and 250 bar and can result in substantially complete destruction of organic wastes.

Large industrial compressors are often employed to compress natural air and supply it to the wet oxidation process. Such compressors are extremely expensive and, hence, back-up compressors are not commonly provided. In the event a compressor fails or must be taken off-line for maintenance, the entire wet oxidation apparatus would have to be closed down.

A further problem relating to the use of compressors resides in the fact that large quantities of air must be compressed in order to provide a sufficient quantity of oxygen for oxidation. Also, the size of the reactor must be increased to compensate for the fact that the presence of nitrogen and the low reactivity of air require it to be used in greater quantities to supply the required levels of oxygen.

It is known to use pure oxygen in wet oxidation processes. Liquid oxygen is stored in a tank and pumped, in the liquid phase, at high pressure through a vaporizer before being introduced into the waste water entering the reactor. The use of pure oxygen reduces significantly the quantity of gas being passed through the reactor and hence, reduces the problem of gas stripping of organics which then do not react with the oxygen and which may cause an odor problem. However, the use of pure oxygen does present a fire hazard, particularly if the reactor contains or is formed from titanium or similar reactive materials.

It is an object of the present invention to provide a wet oxidation apparatus which reduces and possibly overcomes the above mentioned problems.

SUMMARY OF THE INVENTION

Accordingly, the present invention provides a wet oxidation apparatus comprising storage means, for storing liquid oxygen and liquid nitrogen separately or as a mixture; pumping means for pumping said liquid gases and for raising the pressure thereof; evaporator means for evaporating said liquid gas; mixing means for mixing the resultant gas with waste water to be treated, and a reactor for receiving said mix of gas and water and in which polluting substances contained in said waste water are oxidized at a temperature greater than 150° C.

BRIEF SUMMARY OF THE DRAWINGS

The wet oxidation apparatus according to the present invention is illustrated in the accompanying drawings in which.

DETAILED DESCRIPTION OF THE INVENTION

Preferably, the present invention provides a wet oxidation apparatus comprising a liquid oxygen storage tank; a high pressure pump for pumping said liquid oxygen thereby raising its pressure; an evaporator for evaporating said liquid oxygen; nitrogen supply means for supplying nitrogen; a first mixer for mixing said evaporated oxygen and said nitrogen; and a second mixer for mixing said oxygen/nitrogen mix with waste water to be treated.

The nitrogen supply means may consist of a compressor for supplying compressing natural air to the mixer. The source of nitrogen may alternatively, or additionally, comprise a liquid nitrogen storage tank; a second high pressure pump for pumping said liquid nitrogen thereby raising its pressure; and a second evaporator, for evaporating said liquid nitrogen.

Advantageously, said first and second pumps are cross-linked such that either pump may pump either liquid gas. In a particularly advantageous arrangement, the apparatus further includes a feedback control for adjusting the ratio of oxygen to nitrogen so as to maintain the percentage oxygen in the mixed gas at or below a predetermined level. Preferably, the control is configured for producing a gas mixture having an oxygen concentration of 21% or more by volume and the pumps pressurize said gas mixture to between 20 and 200 bar.

Preferably, the apparatus includes monitoring means for monitoring the oxygen concentration of any mixed gas prior to its introduction into said waste water. Advantageously, the apparatus additionally includes an automatic switching means for automatically closing the apparatus down upon detection of an oxygen concentration above a second predetermined value. Conveniently, the switching means may be configured to provide for introducing the supply of oxygen from said liquid store thereof upon turndown or closedown of said compressor.

Figure 1:
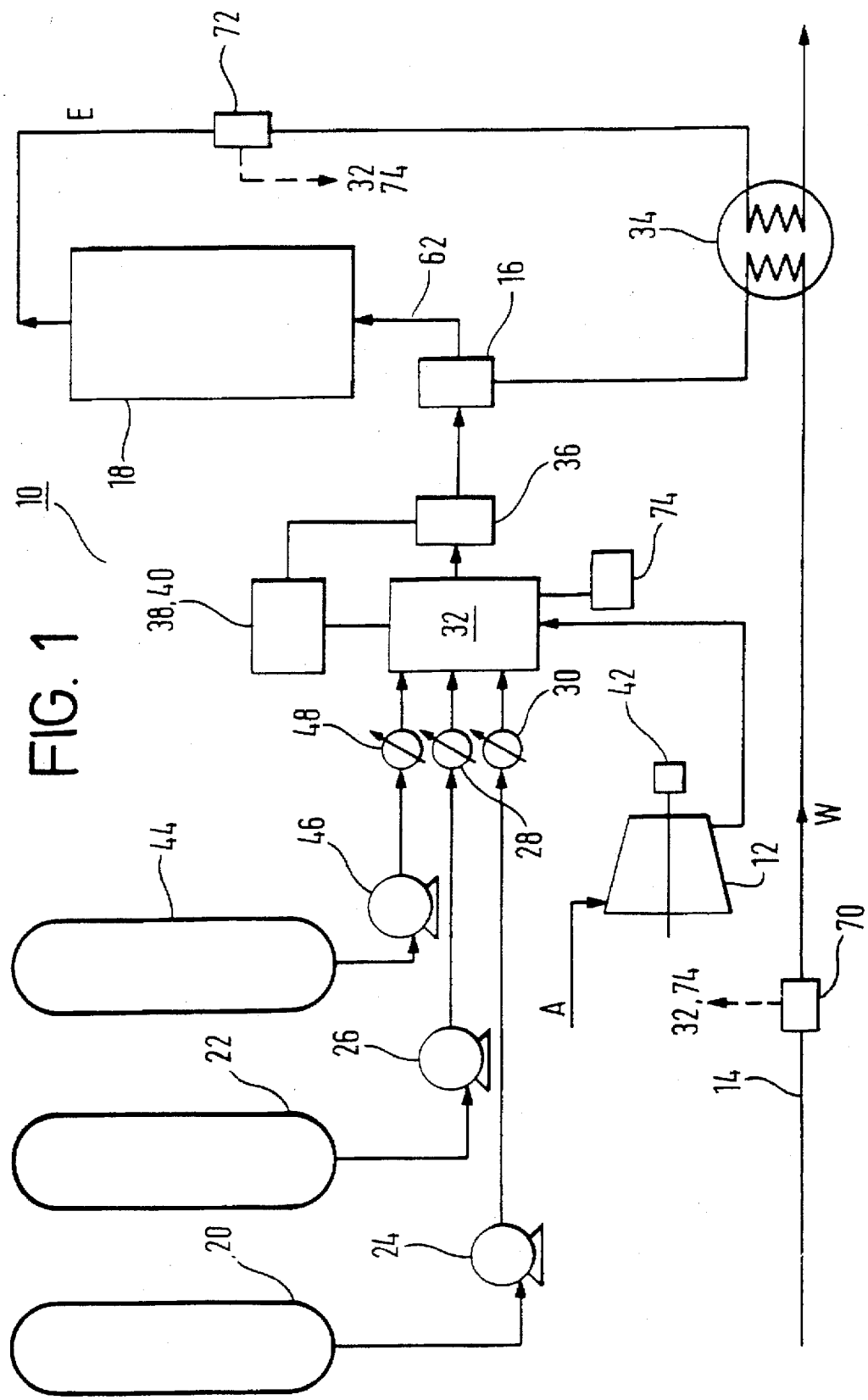
FIG. 1 is a schematic representation of a preferred apparatus according to the present invention.

Turning to the drawing and referring specifically to FIG. 1, wet oxidation apparatus 10 comprises, in one embodiment, a compressor 12 for compressing natural air from supply A, waste water W supply pipe 14 and mixing means 16 (hereafter referred to as second mixer 16) for mixing the compressed air and waste water prior to its introduction into reactor 18. Liquid nitrogen and liquid oxygen storage tanks 20, 22 act to supplement or replace the supply of air from compressor 12 in a manner to be described in detail later herein. High pressure pumps 24, 26 act to pump the liquid nitrogen and oxygen from tanks 20, 22 to evaporators 30, 28, respectively, each of which acts to vaporize the liquid gas before supplying it to a mixer 32 (hereinafter referred to as first mixer 32).

A heat exchanger 34 acts to heat the incoming waste water W by heat exchange with the hot exhaust E from reactor 18 prior to its delivery to second mixer 16. Pumps 24, 26 are operated so as to provide a gas having a pressure of between 20 and 200 bar. An oxygen monitor 36 may be positioned downstream of first mixer 32 so as to monitor to oxygen content of any mixed gas prior to its introduction into any waste water W. A feedback control, illustrated schematically at 38 is provided for monitoring the oxygen concentration and adjusting the mixing of the various components in accordance with predetermined control parameters which will be discussed in detail later herein. An automatic or manual switch 40 is provided for on the control 38 for introducing the supply of liquid oxygen or oxygen and nitrogen during compressor failure or turndown. For automatic switching, a compressor monitoring device 42 is provided for monitoring the performance of compressor 12 and for initiating control over controller 38 as and when necessary. Additional gases, such as ozone, may be stored in additional tank 44. When such additional tanks are provided, it will be necessary to provide a pump 46 and evaporate 48 similar to those described above. Any two or more of pumps 24, 26, 46 may be cross-linked in a manner well known to those skilled in the art so as to enable one pump to provide a backup for the other in the event of a single pump failure. Pump 46, for instance, might be used fairly infrequently and could be coupled by pipes and valves (not shown) so as to backup oxygen pump 24 which is somewhat more important to the operation of the apparatus 10.

Due to the high reactivity of ozone and hence its short life, it may be advantageous to employ an ozone generator coupled for direct supply to the reactor 18 rather than temporarily store it in tank 44 for eventual supply via pump 46. Whilst a number of commercially available ozone generators are suitable for use with the present invention, it has been found that, due to its ability to produce ozone in large quantities at high yield, generators of the corona discharge type are particularly well suited to the present arrangement. Such generators use a precisely controlled electrical plasma discharge to impart energy to an oxygen gas stream, causing some of the molecules to reform into ozone molecules. The ozone can be generated using either atmospheric air or pure oxygen as a feedstock. To obtain optimum operating conditions the feed gas must be dry, have a high percentage of oxygen and be free from impurities such as dust, hydrocarbons and hydrogen. Whilst air is free, its use in an ozone generator requires pre-conditioning which further increases the complexity and cost of the equipment necessary for ozone production.

Although pure oxygen is more expensive as a feed gas, most ozone generators are designed for its use as it requires no pretreatment before introduction to the ozonizer. In addition, simple and smaller equipment can be used to generate ozone if pure oxygen is used as the feed gas. Also, as oxygen is the only waste product of the ozonizer, and oxygen may be employed in reactor 18, the entire output of the ozonizer 50 may be utilized. Alternatives embodiments utilizing an ozonizer are illustrated in FIGS. 2 and 3.

Figure 2:
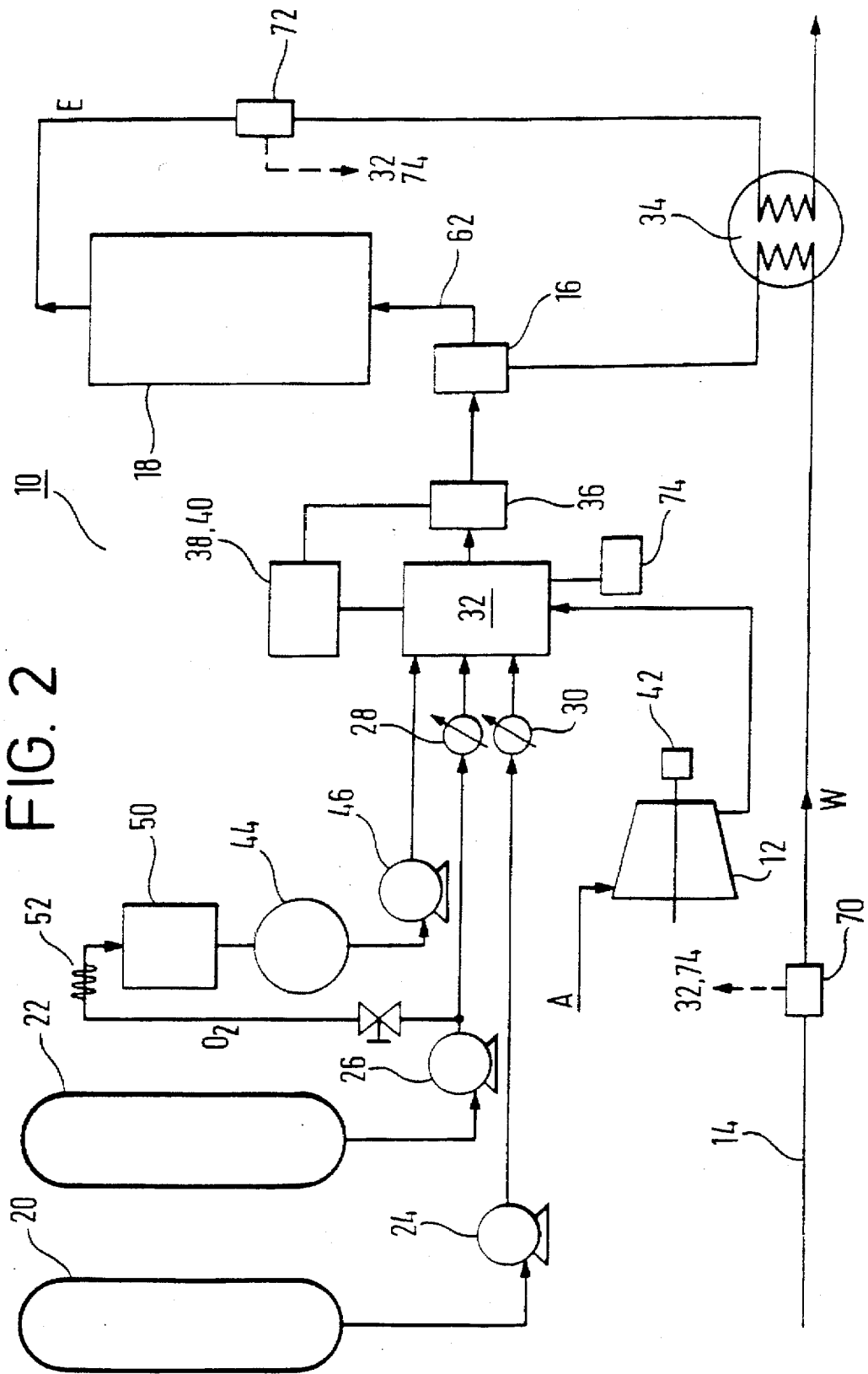
FIG. 2 is a schematic representation of a second embodiment of the apparatus of the present invention.

Referring to FIG. 2, an ozonizer 50 may be provided with oxygen from tank 22 via pump 26 and vaporizer 52 for conversion into ozone in the usual manner. Once produced, the ozone may be stored temporarily in tank 44 which effectively acts as a small buffer tank or may be directed straight to mixer 32. clearly, vaporizer 48 (FIG. 1) may be dispensed with and may be replaced, if desired, by a booster pump (not shown). Alternatively, as shown in FIG. 3 atmospheric air A may be dried and treated by removal of any impurities in treatment zone 56 before being directed to ozonizer 50 for conversion to ozone in the conventional manner. A compressor 58 may be employed to compress the air before it enters treatment zone 56. Alternatively, the apparatus may be configured so that compressor 12 may be employed to supply compressed air to treatment zone 56.

Figure 3:
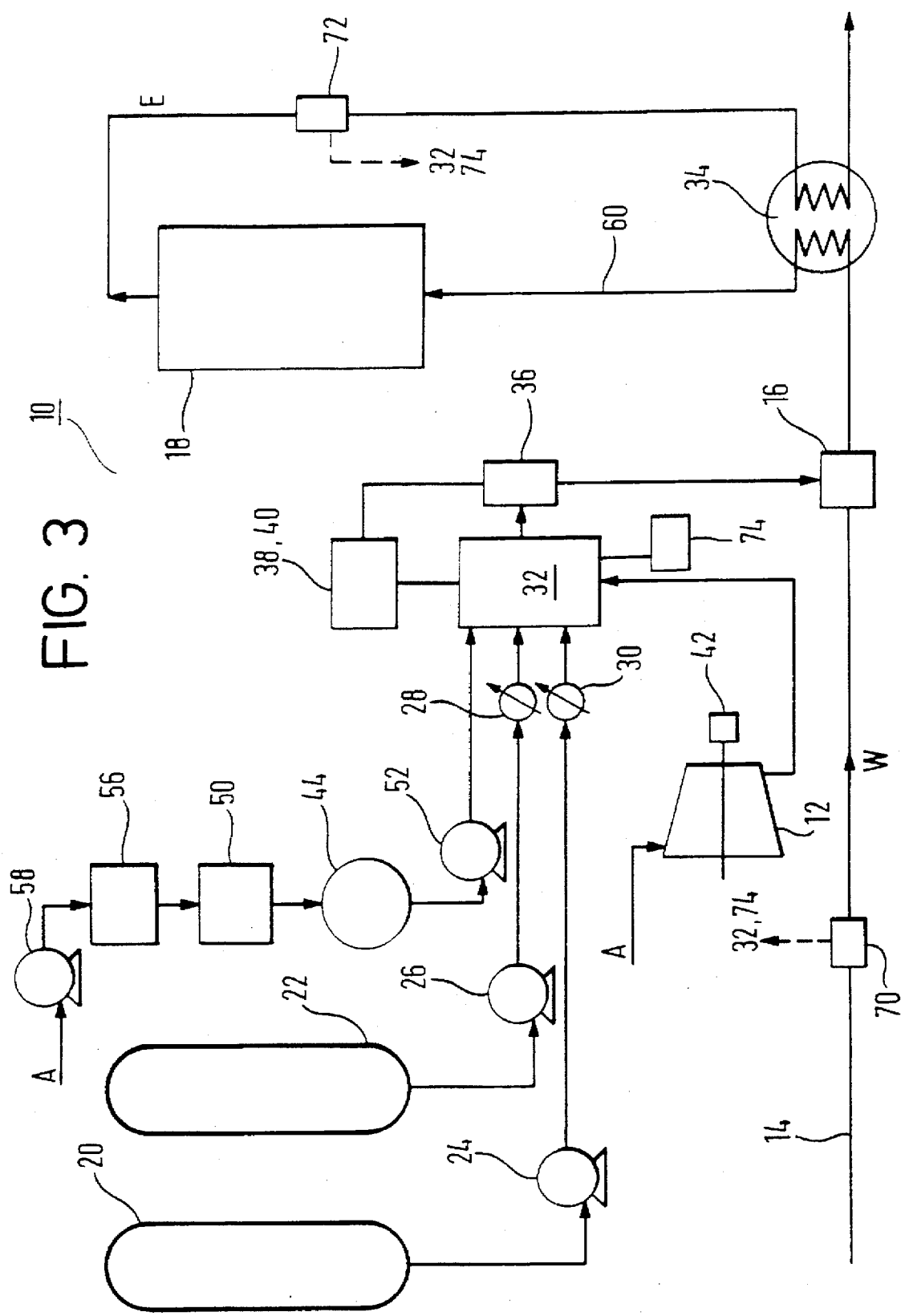
FIG. 3 is a schematic representation of a third embodiment of the apparatus of the present invention.

Also illustrated in FIG. 3 is an alternative gas/liquid mixing arrangement in which the mixer 16 is positioned upstream of heat exchanger 34, thus allowing the gas injected into the waste to undergo heating by exposure to the heating effect of hot exhaust E before it is directed to reactor 18. Such an arrangement would significantly increase the reaction temperature and could also help reduce the size of the reactor itself and/or the residence time therein for complete reaction. Such an arrangement would also help promote efficient reaction as the reaction itself would commence within the pipework 60 between heat exchanger 34 and reactor 18. The length and size of this pipe may be selected to suit the reaction requirement. The arrangements shown in FIGS. 1 and 2 may also benefit from this arrangement by lengthening pipe 62 between mixer 16 and reactor 18. Alternatively, the pipe 60 or 62 may be kept short or mixing may take place within the reactor 18 in which case the reaction will be confined within reactor 18.

A number of different modes of operation present themselves. Firstly, compressor 12 may be operated such that it is the only source of oxygen and nitrogen being supplied to the mixer 16, in which case the apparatus 10 is operated in a manner already well known and therefore not described further herein. Obviously, during this first mode of operation, monitor 36 and feedback control 38 are redundant and may be switched off.

A second, alternative, mode of operation is possible by employing additional oxygen from tank 20 to supplement the supply of compressed air form compressor 12. In this mode of operation, the compressed air and substantially pure oxygen are mixed in first mixer 32 before being introduced into the flow of waste water in second mixer 16. The oxygen monitor 36 and feedback control 38 are employed to ensure the oxygen concentration within the gas mixture does not rise above a predetermined level, thereby facilitating fire safe operation of reactor 18. It will, however, be appreciated that this mode of operation will result in an oxygen concentration in the mixed gas greater than that of atmospheric air. Such a process is therefore not preferred when extremely fire sensitive materials are being employed in the reactor 18.

A third, preferred, mode of operation is possible if one employs liquid nitrogen in addition to liquid oxygen. In this mode, the oxygen and nitrogen are mixed so as to produce a mixture which may supplement or even replace the supply of air from compressor 12. Obviously, one can mix the oxygen and nitrogen in any desired ratio and, hence, it will be able to produce, for example, synthetic air or a gas containing an oxygen concentration somewhat higher than natural air which is particularly suitable for use in super critical wet oxidation. In this mode of operation, compressor monitor 42 is employed to monitor the compressor performance and to adjust the flow of oxygen and/or nitrogen from liquid stores 22, 20 as and when required. For example, if the compressor has to be taken off-line for maintenance, it is normal to gradually reduce its speed, and hence its output before bringing it to a halt. During this "spool down" period, a combination of liquid oxygen and nitrogen could be employed to supplement the compressor output. The same is possible during "spool up" of the compressor. Alternatively, when compressor 12 is out of action, due to failure or maintenance, the liquid oxygen/nitrogen sources may be employed as a replacement for compressor air.

In any of the above modes of operation it may be desirable to add a further stream of gas such as, for example, ozone to the waste water. If this is desirable, the previously mentioned arrangements are employed to supply the supplement gas to mixer 32 for mixing in the manner described above.

Clearly, one may operate controller 38 so as to ensure oxygen is supplied at any particular oxygen to nitrogen ratio. However, in a preferred arrangement, liquid oxygen and nitrogen are mixed in a proportion of 21% oxygen with the remainder nitrogen, thus providing a concentration similar to atmospheric air. In accordance with recent changes in the supply of liquid nitrogen/oxygen, it is possible to create a synthetic air mixture by combining the correct quantities of liquid oxygen and liquid nitrogen and storing them in the same tank. In such an arrangement, one or other of the tanks 20, 22 would be redundant and may therefore be dispensed with. If properly managed, the boil off gas from such a mixture might have the correct nitrogen/oxygen ratio for direct injection without further modification, thus further reducing the equipment inventory. Ozone may also be present.

One advantageous feature not mentioned thus far is the optional analytical system shown schematically at 70 and 72 in FIG. 1. Item 70 comprises an analyzer for analyzing the incoming water and determining the chemical oxygen demand (COD) whilst item 72 comprises an optional gas analyzer for analyzing the exhaust gas E. Advantageously, each of the analyzers are linked to mixer 32 and a further control system 74 used for initiating control over the mixer 32 so as to adjust the various gas flows in response to the COD. One of the advantages of such an arrangement resides in its ability to respond to the changing oxygen demand of the effluent without large changes in volumetric gas flows or reducing the effluent flow rate. For example, utilizing air, any increase in oxygen supply is accompanied by approximately four times the volume of nitrogen whilst an increase in pure oxygen supply would obviously have no nitrogen increase associated with it.

Whilst the operation of the reactor 18 forms only a part of the present invention, it will be appreciated that such reactors are generally operated at temperatures above 150° C. and up to 350° C. and operation at above these temperatures is fairly common. Super critical operation, as mentioned earlier, generally operates at about 600° C. and 250 bar.

I claim:

1. A wet oxidation apparatus comprising: storage means for storing liquid oxygen; pumping means for pumping said liquid oxygen thereby raising its pressure; evaporator means for evaporating said liquid oxygen; nitrogen supply means for supplying nitrogen; a first mixer for mixing the evaporated oxygen and the nitrogen; a second mixer for mixing the resultant mixture of gas with waste water to be treated, and a reactor for receiving said mix of gas and water and in which polluting substances contained in said waste water are oxidized at a temperature of greater than 150° C., wherein said nitrogen supply means comprises a compressor for compressing atmospheric air and for supplying said compressed air to said first mixer, storage means for storing liquid nitrogen, a second pumping means for pumping said liquid nitrogen thereby raising its pressure, and a second evaporator means for evaporating said liquid nitrogen.

2. A wet oxidation apparatus in accordance with claim 1, wherein said first and second pumping means are cross-linked such that either pumping means may pump either liquid gas.

3. A wet oxidation apparatus in accordance with claim 1 including monitoring means for monitoring the oxygen concentration of said gas mixture prior to its mixing with said waste water.

4. A wet oxidation apparatus in accordance with claim 3 further including a feedback control for adjusting the ratio of oxygen to nitrogen so as to maintain the percentage oxygen in the mixture of gas at a predetermined level.

5. A wet oxidation apparatus in accordance with claim 4 further including an automatic switching means for automatically closing the apparatus down upon detection of an oxygen concentration above a second predetermined value.

6. A wet oxidation apparatus in accordance with claim 4, wherein said control is configured for producing a gas mixture having an oxygen concentration of about 21% or more by volume.

7. A wet oxidation apparatus in accordance with claim 1 including switching means for introducing oxygen and nitrogen from the respective liquid storage means upon turndown or closedown of said compressor.

8. A wet oxidation apparatus in accordance with claim 1, wherein the mixture of oxygen and nitrogen mixed with said waste water is at a pressure of between about 20 and 200 bar.

* * * * *